United States Patent
Lee

(10) Patent No.: US 11,550,743 B2
(45) Date of Patent: Jan. 10, 2023

(54) SIGNAL TRANSMITTING CIRCUIT, AND SEMICONDUCTOR APPARATUS AND SEMICONDUCTOR SYSTEM USING THE SAME

(71) Applicant: SK hynix Inc., Icheon-si (KR)

(72) Inventor: Hyun Bae Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 41 days.

(21) Appl. No.: 17/375,350

(22) Filed: Jul. 14, 2021

(65) Prior Publication Data

US 2022/0269624 A1 Aug. 25, 2022

(30) Foreign Application Priority Data

Feb. 24, 2021 (KR) ........................ 10-2021-0024605

(51) Int. Cl.
*G06F 13/20* (2006.01)
*G06F 13/42* (2006.01)

(52) U.S. Cl.
CPC .......... *G06F 13/20* (2013.01); *G06F 13/4221* (2013.01); *G06F 13/4234* (2013.01)

(58) Field of Classification Search
CPC ....................................................... G06F 13/20
See application file for complete search history.

(56) References Cited

U.S. PATENT DOCUMENTS 7,162,672 B2    1/2007   Werner et al.

FOREIGN PATENT DOCUMENTS

KR        1020090001356 A     1/2009

*Primary Examiner* — Henry Tsai
*Assistant Examiner* — Juanito C Borromeo
(74) *Attorney, Agent, or Firm* — William Park & Associates Ltd.

(57) ABSTRACT

A signal transmitting circuit includes a first output control circuit, a second output control circuit, a first output driver, and a second output driver. The first output control circuit generates a first main driving signal based on a first control signal and generates a first auxiliary driving signal based on the first control signal and a second control signal. The second output control circuit generates a second main driving signal based on the second control signal and generates a second auxiliary driving signal based on the first control signal and the second control signal. The first output driver drives an output node based on the first main driving signal and the first auxiliary driving signal. The second output driver drives the output node based on the second main driving signal and the second auxiliary driving signal.

24 Claims, 8 Drawing Sheets

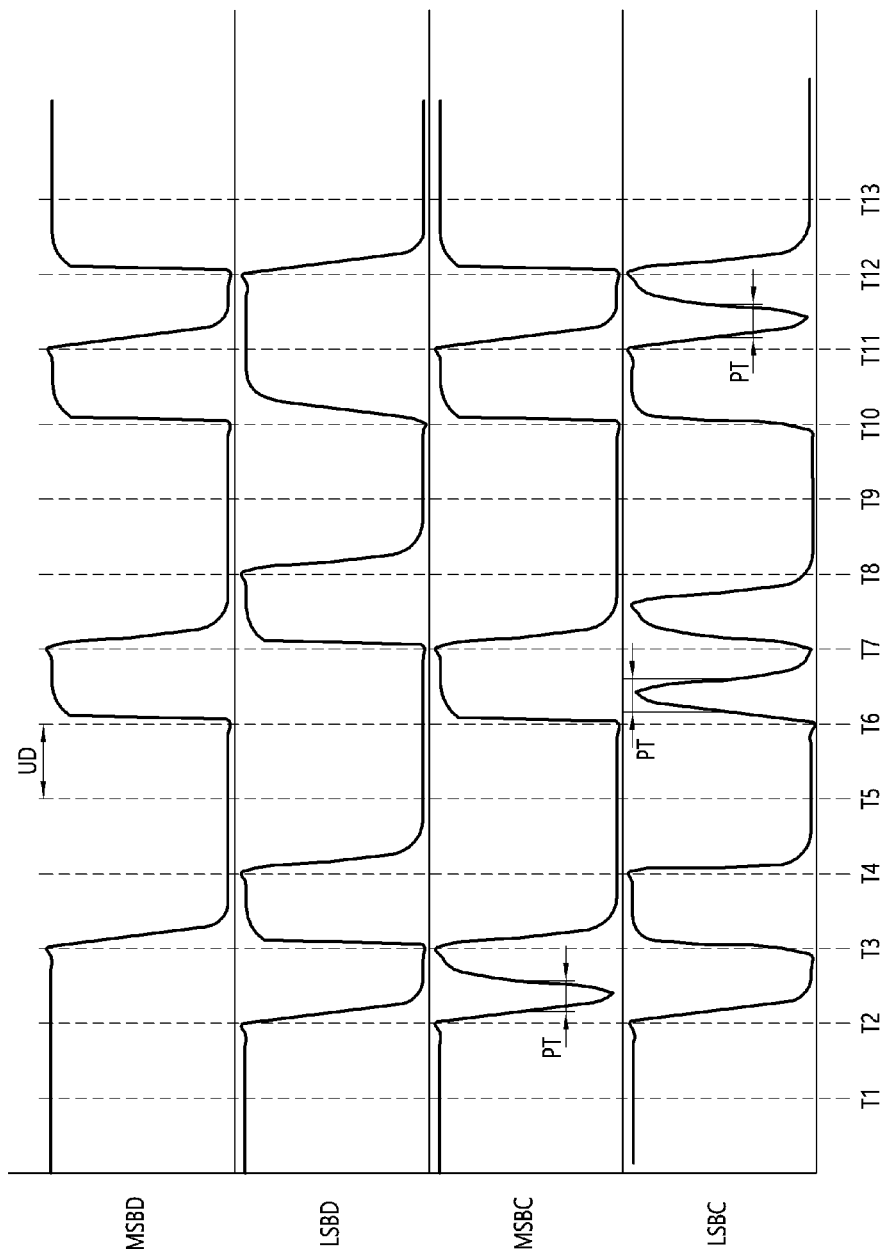

SIGNAL TRANSMITTING CIRCUIT, AND SEMICONDUCTOR APPARATUS AND SEMICONDUCTOR SYSTEM USING THE SAME

CROSS-REFERENCES TO RELATED APPLICATION

The present application claims priority under 35 U.S.C. § 119(a) to Korean application number 10-2021-0024605, filed on Feb. 24, 2021, in the Korean Intellectual Property Office, which is incorporated herein by reference in its entirety.

BACKGROUND

1. Technical Field

Various embodiments generally relate to an integrated circuit technology, and more particularly, to a signal transmitting circuit, and a semiconductor apparatus and semiconductor system using the same.

2. Related Art

An electronic device may include a number of electronic components. Among the electronic components, a computer system may include a number of semiconductor apparatuses constituted by semiconductors. The semiconductor apparatuses constituting the computer system may transmit/receive a clock signal and data to communicate with each other. The semiconductor apparatuses may be each coupled to another semiconductor apparatus through a signal bus such as a data bus, and transmit a signal with information that corresponds to data through the signal bus. The semiconductor apparatuses may each include a signal transmitting circuit to transmit the signal through the signal bus, and the signal transmitting circuit may transmit an analog voltage through the signal bus, in order to transmit the signal. In general, the signal transmitting circuit may transmit an analog voltage that corresponds to a high logic level and an analog voltage that corresponds to a low logic level. However, in order to transmit more pieces of information through one signal transmission, a multi-level signal transmitting method using PAM (Pulse Amplitude Modulation) is used. The multi-level signal transmitting method may divide the level of the analog voltage that is transmitted through the signal bus, and transmit 2 or more-bit digital information as one analog signal. In the multi-level signal transmitting method, it may be important to accurately define the voltage level of one analog signal including plural pieces of digital information.

SUMMARY

In an embodiment, a signal transmitting circuit may include a first output control circuit, a second output control circuit, a first output driver, and a second output driver. The first output control circuit may be configured to generate a first main driving signal based on a first control signal and generate a first auxiliary driving signal based on the first control signal and a second control signal. The second output control circuit may be configured to generate a second main driving signal based on the second control signal and generate a second auxiliary driving signal based on the first control signal and the second control signal. The first output driver may be configured to drive an output node based on the first main driving signal and the first auxiliary driving signal. The second output driver may be configured to drive the output node based on the second main driving signal and the second auxiliary driving signal.

In an embodiment, a signal transmitting circuit may include a first output control circuit, a second output control circuit, a first output driver, and a second output driver. The first output control circuit may be configured to generate a first main driving signal and a first auxiliary driving signal from a first control signal and configured to change a logic level of the first auxiliary driving signal to a second logic level for a predetermined time when the logic level of the first control signal is retained at a first logic level and a logic level of the second control signal transitions from the first logic level to the second logic level. The second output control circuit may be configured to generate a second main driving signal and a second auxiliary driving signal from the second control signal and configured to change the logic level of the second auxiliary driving signal to the second logic level for the predetermined time when the logic level of the second control signal is retained at the first logic level and the logic level of the first control signal transitions from the first logic level to the second logic level. The first output driver may be configured to drive an output node based on the first main driving signal and the first auxiliary driving signal. The second output driver may be configured to drive the output node based on the second main driving signal and the second auxiliary driving signal.

In an embodiment, a semiconductor apparatus may include a signal transmitting circuit. The signal transmitting circuit may be configured to generate an output signal based on a first control signal and a second control signal, which define at least a first state, a second state, a third state, and a fourth state of a bit stream. The signal transmitting circuit may be configured to perform an emphasis operation on the output signal based on a control signal whose logic level is retained, between the first and second control signals, when the bit stream transitions from one of the first and fourth states to one of the second and third states.

BRIEF DESCRIPTION OF THE DRAWINGS

FIG. 7 is a timing diagram illustrating the operation of the signal transmitting circuit in accordance with the present embodiment.

DETAILED DESCRIPTION

Hereinafter, a signal transmitting circuit, and a semiconductor apparatus and semiconductor system using the same according to the present disclosure will be described below with reference to the accompanying drawings through exemplary embodiments.

Figure 1:
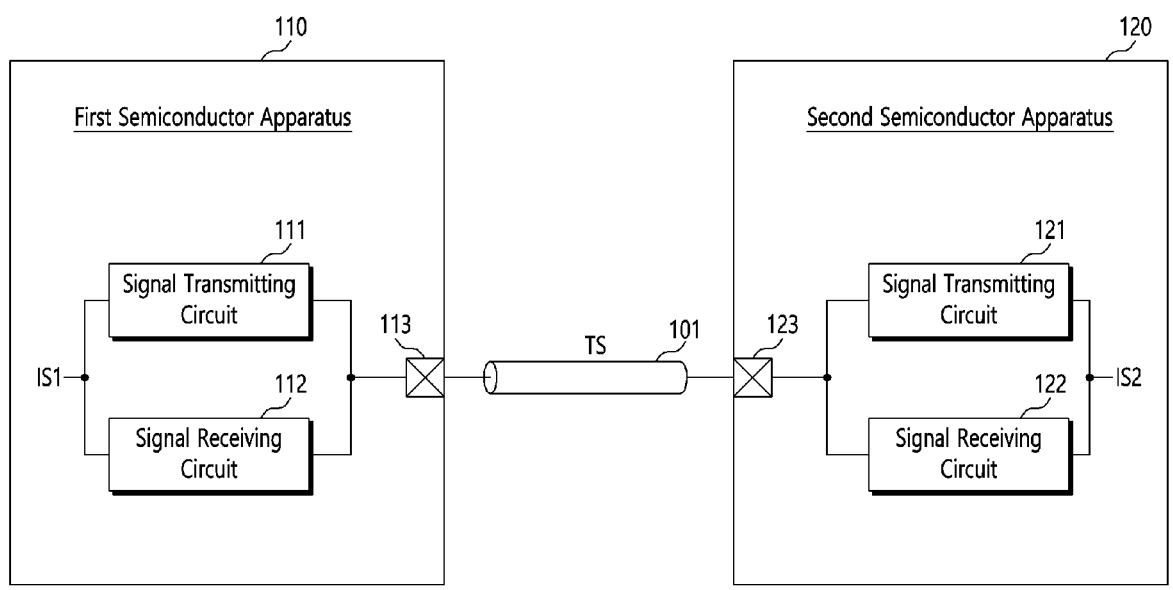
FIG. 1 is a diagram illustrating a configuration of a semiconductor system in accordance with an embodiment, and the voltage levels of a Tx (Transmit) signal that is transmitted through a signal transmitting bus.
Figure 1:
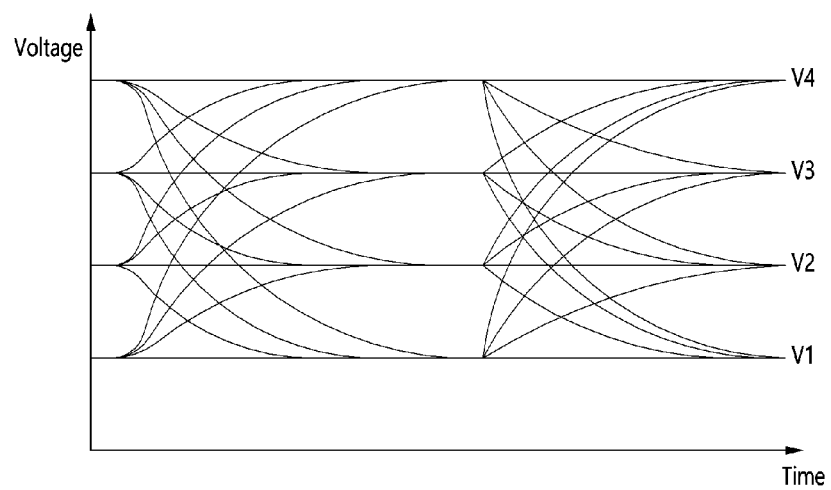

FIG. 1 is a diagram illustrating a configuration of a semiconductor system 1 in accordance with an embodiment, and the voltage levels of a Tx (Transmit) signal TS that is transmitted through a signal transmitting bus 101. Referring to FIG. 1, the semiconductor system 1 may include a first semiconductor apparatus 110 and a second semiconductor apparatus 120. The first semiconductor apparatus 110 may provide various control signals that are required for the second semiconductor apparatus 120 to operate. The first semiconductor apparatus 110 may include various types of host apparatuses. For example, the first semiconductor apparatus 110 may include one or more of a CPU (Central Processing Unit), a GPU (Graphics Processing Unit), an MMP (Multi-Media Processor), a digital signal processor, an AP (Application Processor), and a memory controller. The second semiconductor apparatus 120 may be a memory apparatus, for example, and the memory apparatus may include a volatile memory and a nonvolatile memory. The examples of the volatile memory may include an SRAM (Static RAM), DRAM (Dynamic RAM) and SDRAM (Synchronous DRAM), and the examples of the nonvolatile memory may include a ROM (Read Only Memory), PROM (Programmable ROM), EEPROM (Electrically Erasable and Programmable ROM), EPROM (Electrically Programmable ROM), flash memory, PRAM (Phase change RAM), MRAM (Magnetic RAM), RRAM (Resistive RAM), and FRAM (Ferroelectric RAM).

The second semiconductor apparatus 120 may be coupled to the first semiconductor apparatus 110 through a plurality of buses. The plurality of buses may be signal transmitting lines, links or channels for transmitting signals. Although not illustrated, the plurality of buses may include a clock bus, a command address bus, a data bus and the like, for example. The clock bus and the command address bus may be a unidirectional bus, and the data bus may be a bidirectional bus. The second semiconductor apparatus 120 may be coupled to the first semiconductor apparatus 110 through the signal transmitting bus 101. The signal transmitting bus 101 may include any types of buses that are configured to transmit a signal that is synchronized with a clock signal. For example, the signal transmitting bus 101 may be a bidirectional bus, like a data bus. In an embodiment, the signal transmitting bus 101 may be a unidirectional bus. Even when the signal transmitting bus 101 is a unidirectional bus, the technical idea of the present disclosure may be applied in a similar manner. The Tx signal TS that is transmitted through the signal transmitting bus 101 may be a multi-level signal, and the signal transmitting bus 101 may be a multi-level signal transmitting line for transmitting a multi-level signal. For example, the Tx signal TS may have at least four different voltage levels. According to the state of a bit stream, the Tx signal TS may have one of the four different voltage levels. The bit stream may include two or more consecutive binary bits. The bit stream may have at least a first state, a second state, a third state and a fourth state. The first state may correspond to a bit stream of '0, 0', the second state may correspond to a bit stream of '0, 1', the third state may correspond to a bit stream of '1, 0', and the fourth state may correspond to a bit stream of '1, 1'. The Tx signal TS may have a first voltage level V1, a second voltage level V2, a third voltage level V3 and a fourth voltage level V4. The graph illustrated in FIG. 1 shows the voltage levels of the Tx signal TS that is transmitted through the signal transmitting bus 101. In the graph, the x-axis may indicate time, and the y-axis may indicate voltage. In order to transmit a bit stream with the first state, the Tx signal TS may have the first voltage level V1. In order to transmit a bit stream with the second state, the Tx signal TS may have the second voltage level V2. In order to transmit a bit stream with the third state, the Tx signal TS may have the third voltage level V3. In order to transmit a bit stream with the fourth state, the Tx signal TS may have the fourth voltage level V4. The second voltage level V2 may be higher than the first voltage level V1, the third voltage level V3 may be higher than the second voltage level V2, and the fourth voltage level V4 may be higher than the third voltage level V3. The voltage level of the Tx signal TS may be retained at the current voltage level or changed to the other three voltage levels based on whether the state of the bit stream transitions. For example, when the state of the bit stream transitions from the second state to the third state, the voltage level of the Tx signal TS may be changed from the second voltage level V2 to the third voltage level V3.

The first semiconductor apparatus 110 may include a signal transmitting circuit 111 and a signal receiving circuit 112. The signal transmitting circuit 111 and the signal receiving circuit 112 may be coupled to the signal transmitting bus 101 through a pad 113. The signal transmitting circuit 111 may receive an internal signal IS1 of the first semiconductor apparatus 110 and may transmit a Tx signal TS that is generated based on the internal signal IS1 to the second semiconductor apparatus 120 through the pad 113 and the signal transmitting bus 101. The signal receiving circuit 112 may receive the Tx signal TS that is transmitted through the signal transmitting bus 101 and the pad 113, and may generate the internal signal IS1 based on the Tx signal TS. For example, the signal transmitting circuit 111 may generate the Tx signal TS with one voltage level among the first to fourth voltage levels based on the state of the bit stream of the internal signal IS1. The signal transmitting circuit 111 may be a DAC (Digital-to-Analog Converter) that is configured to convert the bit stream of the internal signal IS1, a digital signal, into the Tx signal TS, an analog voltage. The signal receiving circuit 112 may sense the voltage level of the Tx signal TS and may recover the bit stream from the Tx signal TS. The signal receiving circuit 112 may generate the internal signal IS1 by recovering the bit stream. The signal receiving circuit 112 may be an ADC (Analog-to-Digital Converter) that is configured to convert the Tx signal TS as an analog voltage into the bit stream as a digital signal.

The second semiconductor apparatus 120 may include a signal transmitting circuit 121 and a signal receiving circuit 122. The signal transmitting circuit 121 and the signal receiving circuit 122 may be coupled to the signal transmitting bus 101 through a pad 123. The signal transmitting circuit 121 may receive an internal signal IS2 of the second semiconductor apparatus 120 and may transmit a Tx signal TS that is generated based on the internal signal IS2 to the first semiconductor apparatus 110 through the pad 123 and the signal transmitting bus 101. The signal receiving circuit 122 may receive the Tx signal TS that is transmitted through the signal transmitting bus 101 and the pad 123, and may generate the internal signal IS2 based on the Tx signal TS. For example, the signal transmitting circuit 121 may generate the Tx signal TS with one voltage level of the first to fourth voltage levels based on the state of the bit stream of the internal signal IS2. The signal transmitting circuit 121 may be a DAC that is configured to convert the bit stream of the internal signal IS2 as a digital signal into the Tx signal TS as an analog voltage. The signal receiving circuit 122 may sense the voltage level of the Tx signal TS and may recover the bit stream from the Tx signal TS. The signal receiving circuit 122 may generate the internal signal IS2 by recovering the bit stream. The signal receiving circuit 122 may be an ADC that is configured to convert the Tx signal TS as an analog voltage into the bit stream as a digital signal.

Figure 2:
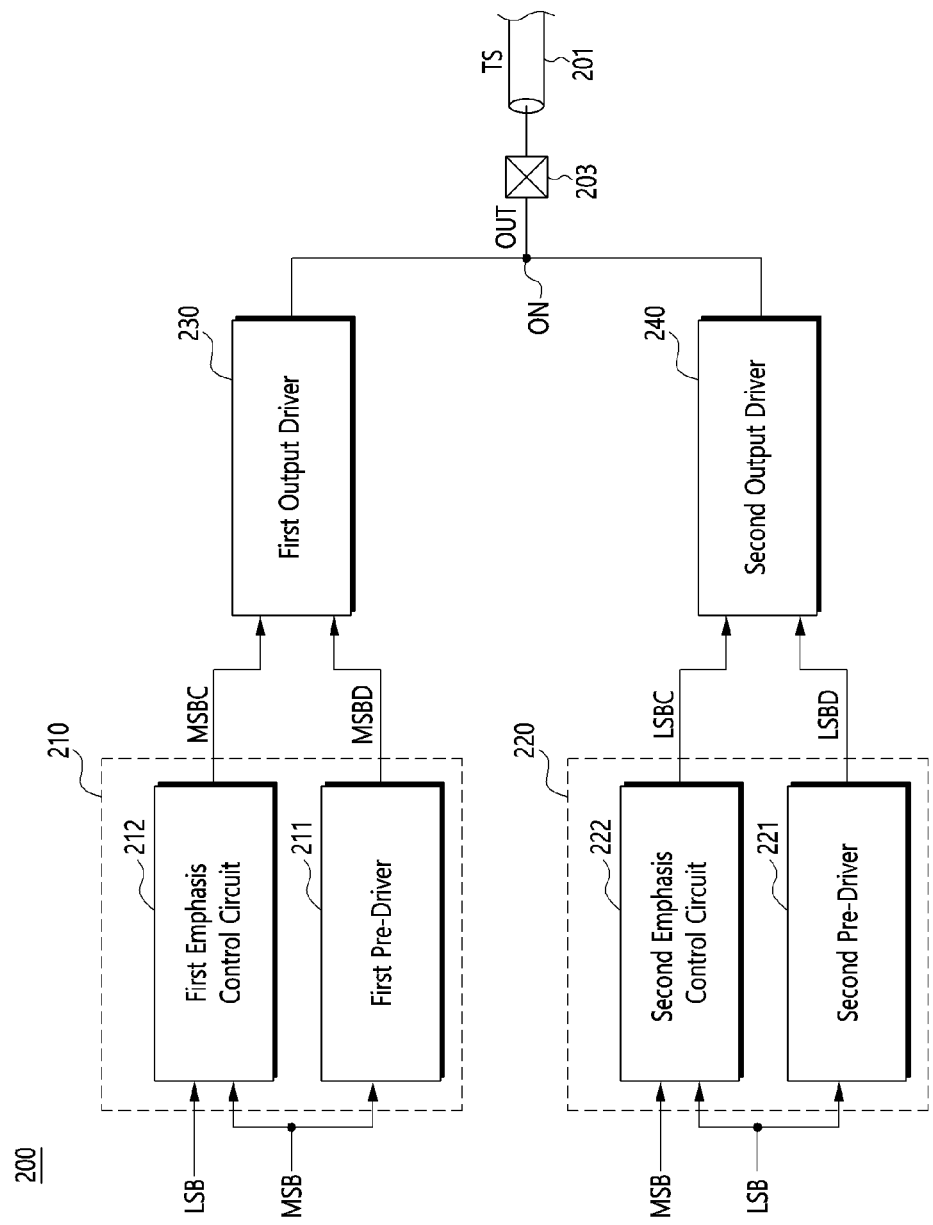
FIG. 2 is a diagram illustrating a configuration of a signal transmitting circuit in accordance with an embodiment.

FIG. 2 is a diagram illustrating a configuration of a signal transmitting circuit 200 in accordance with an embodiment. The signal transmitting circuit 200 may be applied as each of the signal transmitting circuits 111 and 121, illustrated in FIG. 1. Referring to FIG. 2, the signal transmitting circuit 200 may receive a first control signal MSB and a second control signal LSB, and may generate an output signal OUT based on the first and second control signals MSB and LSB. The output signal OUT may be provided as a Tx signal TS that is transmitted through a pad 203 and a signal transmitting bus 201. The first and second control signals MSB and LSB may define the state of a bit stream. The bit stream may include two or more binary bits, and the first and second control signals MSB and LSB may constitute the bit stream. For example, the first control signal MSB may be the most significant bit of the bit stream, and the second control signal LSB may be the least significant bit of the bit stream. When the bit stream has the first state, the first and second control signals MSB and LSB may both have a high logic level. When the bit stream has the second state, the first control signal MSB may have a high logic level, and the second control signal LSB may have a low logic level. When the bit stream has the third state, the first control signal MSB may have a low logic level, and the second control signal LSB may have a high logic level. When the bit stream has the fourth state, the first and second control signals MSB and LSB may both have a low logic level. The signal transmitting circuit 200 may generate the output signal OUT with a plurality of voltage levels based on the first and second control signals MSB and LSB. When the state of the bit stream transitions from the first or fourth state to the second or third state, the signal transmitting circuit 200 may perform an emphasis operation on the output signal OUT. The signal transmitting circuit 200 may perform the emphasis operation based on a control signal that retains a logic level of one of the first and second control signals MSB and LSB, when the state of the bit stream transitions. For example, when the state of the bit stream transitions from the first state to the second state, the first control signal MSB may retain a high logic level, and the second control signal LSB may transition from a high logic level to a low logic level. The signal transmitting circuit 200 may generate the output signal OUT based on the second control signal LSB and may perform an emphasis operation on the output signal OUT based on the first control signal MSB that retains a high logic level.

The signal transmitting circuit 200 may include a first output control circuit 210, a second output control circuit 220, a first output driver 230, and a second output driver 240. The first output control circuit 210 may receive the first and second control signals MSB and LSB, and may generate a first main driving signal MSBD and a first auxiliary driving signal MSBC. The first output control circuit 210 may generate the first main driving signal MSBD based on the first control signal MSB, and may generate the first auxiliary driving signal MSBC based on the first and second control signals MSB and LSB. The first output control circuit 210 may provide the first control signal MSB as the first main driving signal MSBD and the first auxiliary driving signal MSBC. The first output control circuit 210 may sense whether the logic levels of the first and second control signals MSB and LSB transition and may change the first auxiliary driving signal MSBC. When the logic level of the first control signal MSB is retained at a first logic level and the logic level of the second control signal LSB transitions from the first logic level to a second logic level, the first output control circuit 210 may change the first auxiliary driving signal MSBC to the second logic level for a predetermined time. The first logic level may be a high logic level or low logic level. When the first logic level is a high logic level, the second logic level may be a low logic level, and when the first logic level is a low logic level, the second logic level may be a high logic level. When the predetermined time elapses, the first output control circuit 210 may change the first auxiliary driving signal back to the first logic level. The predetermined time may be shorter than the unit duration of each of the first and second control signals MSB and LSB. The predetermined time and the unit duration of each of the first and second control signals MSB and LSB will be described below.

The second output control circuit 220 may receive the first and second control signals MSB and LSB, and may generate a second main driving signal LSBD and a second auxiliary driving signal LSBC. The second output control circuit 220 may generate the second main driving signal LSBD based on the second control signal LSB and may generate the second auxiliary driving signal LSBC based on the first and second control signals MSB and LSB. The second output control circuit 220 may provide the second control signal LSB as the second main driving signal LSBD and the second auxiliary driving signal LSBC. The second output control circuit 220 may sense whether the logic levels of the first and second control signals MSB and LSB transition and may change the second auxiliary driving signal LSBC. When the logic level of the second control signal LSB is retained at the first logic level and the logic level of the first control signal MSB transitions from the first logic level to the second logic level, the second output control circuit 220 may change the second auxiliary driving signal LSBC to the second logic level for a predetermined time. When the predetermined time elapses, the second output control circuit 220 may change the second auxiliary driving signal LSBC back to the first logic level.

The first output driver 230 may receive the first main driving signal MSBD and the first auxiliary driving signal MSBC, and may generate the output signal OUT by driving an output node ON based on the first main driving signal MSBD and the first auxiliary driving signal MSBC. The first output driver 230 may pull up or down the output node ON based on the first main driving signal MSBD. The first output driver 230 may pull up or down the output node ON based on the first auxiliary driving signal MSBC. The second output driver 240 may receive the second main driving signal LSBD and the second auxiliary driving signal LSBC, and may generate the output signal OUT by driving the output node ON based on the second main driving signal LSBD and the second auxiliary driving signal LSBC. The second output driver 240 may pull up or down the output node ON based on the second main driving signal LSBD. The second output driver 240 may pull up or down the output node ON based on the second auxiliary driving signal LSBC.

The first output control circuit 210 may include a first pre-driver 211 and a first emphasis control circuit 212. The first pre-driver 211 may receive the first control signal MSB and may generate the first main driving signal MSBD based on the first control signal MSB. The first pre-driver 211 may generate the first main driving signal MSBD by driving or delaying the first control signal MSB. For example, the delay time of the first pre-driver 211 may correspond to the time that is required for the first emphasis control circuit 212 to generate the first auxiliary driving signal MSBC based on the first and second control signals MSB and LSB. The first emphasis control circuit 212 may receive the first and second control signals MSB and LSB, and may generate the first auxiliary driving signal MSBC based on the first and second control signals MSB and LSB. The first emphasis control circuit 212 may provide the first control signal MSB as the first auxiliary driving signal MSBC. The first emphasis control circuit 212 may generate the first auxiliary driving signal MSBC by driving and delaying the first control signal MSB. The first emphasis control circuit 212 may sense changes in logic levels of the first and second control signals MSB and LSB, and may change the logic level of the first auxiliary driving signal MSBC. When the logic level of the first control signal MSB is retained at the first logic level and the second control signal LSB transitions from the first logic level to the second logic level, the first emphasis control circuit 212 may drive the first auxiliary driving signal MSBC to the opposite logic level. The first emphasis control circuit 212 may change the first auxiliary driving signal MSBC from the first logic level to the second logic level. When the second control signal LSB transitions from the first logic level to the second logic level, the first emphasis control circuit 212 may change the logic level of the first auxiliary driving signal MSBC to the second logic level for a predetermined time. After the predetermined time, the first emphasis control circuit 212 may change the first auxiliary driving signal MSBC back to the first logic level.

The second output control circuit 220 may include a second pre-driver 221 and a second emphasis control circuit 222. The second pre-driver 221 may receive the second control signal LSB, and may generate the second main driving signal LSBD based on the second control signal LSB. The second pre-driver 221 may generate the second main driving signal LSBD by driving or delaying the second control signal LSB. For example, the delay time of the second pre-driver 221 may correspond to the time that is required for the second emphasis control circuit 222 to generate the second auxiliary driving signal LSBC from the first and second control signals MSB and LSB. The second emphasis control circuit 222 may receive the first and second control signals MSB and LSB, and may generate the second auxiliary driving signal LSBC based on the first and second control signals MSB and LSB. The second emphasis control circuit 222 may provide the second control signal LSB as the second auxiliary driving signal LSBC. The second emphasis control circuit 222 may generate the second auxiliary driving signal LSBC by driving and delaying the second control signal LSB. The second emphasis control circuit 222 may sense changes in the logic levels of the first and second control signals MSB and LSB, and may change the logic level of the second auxiliary driving signal LSBC. When the second control signal LSB is retained at the first logic level and the first control signal MSB transitions from the first logic level to the second logic level, the second emphasis control circuit 222 may drive the second auxiliary driving signal LSBC to the opposite logic level. The second emphasis control circuit 222 may change the logic level of the second auxiliary driving signal LSBC from the first logic level to the second logic level. When the first control signal MSB transitions from the first logic level to the second logic level, the second emphasis control circuit 222 may change the second auxiliary driving signal LSBC to the second logic level for a predetermined time. After the predetermined time, the second emphasis control circuit 222 may change the second auxiliary driving signal LSBC back to the first logic level.

Figure 3:
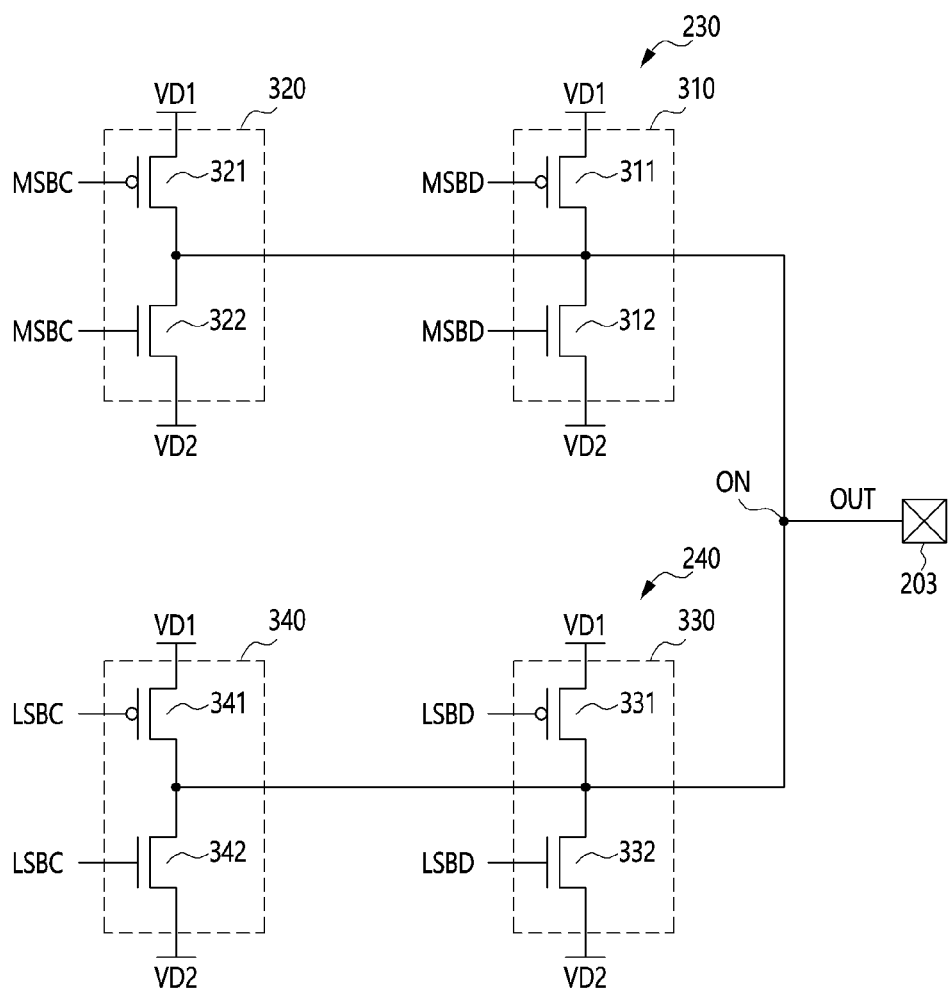
FIG. 3 is a diagram illustrating configurations of first and second output circuits illustrated in FIG. 2.

FIG. 3 is a diagram illustrating the configurations of the first and second output drivers 230 and 240, illustrated in FIG. 2. Referring to FIG. 3, the first output driver 230 may include a first main driver 310 and a first emphasis driver 320. The first main driver 310 may receive the first main driving signal MSBD and may pull up or down the output node ON based on the first main driving signal MSBD. For example, the first main driver 310 may pull up the output node ON to a high logic level when the first main driving signal MSBD is at a low logic level and may pull down the output node ON to a low logic level when the first main driving signal MSBD is at a high logic level. The first emphasis driver 320 may receive the first auxiliary driving signal MSBC and may pull up or down the output node ON based on the first auxiliary driving signal MSBC. For example, the first emphasis driver 320 may pull up the output node ON to a high logic level when the first auxiliary driving signal MSBC is at a low logic level and may pull down the output node ON to a low logic level when the first auxiliary driving signal MSBC is at a high logic level. The drivability of the first main driver 310 to pull up or down the output node ON may be larger than that of the first emphasis driver 320 to pull up or down the output node ON. The output signal OUT may be generated through the output node ON, and outputted through the pad 203 that is coupled to the output node ON.

The second output driver 240 may include a second main driver 330 and a second emphasis driver 340. The second main driver 330 may receive the second main driving signal LSBD and may pull up or down the output node ON based on the second main driving signal LSBD. For example, the second main driver 330 may pull up the output node ON to a high logic level when the second main driving signal LSBD is at a low logic level and may pull down the output node ON to a low logic level when the second main driving signal LSBD is at a high logic level. The second emphasis driver 340 may receive the second auxiliary driving signal LSBC and may pull up or down the output node ON based on the second auxiliary driving signal LSBC. For example, the second emphasis driver 340 may pull up the output node ON to a high logic level when the second auxiliary driving signal LSBC is at a low logic level and may pull down the output node ON to a low logic level when the second auxiliary driving signal LSBC is at a high logic level. The drivability of the second main driver 330 to pull up or down the output node ON may be larger than that of the second emphasis driver 340 to pull up or down the output node ON. The drivability of the second main driver 330 to pull up or down the output node ON may be smaller than that of the first main driver 310 to pull up or down the output node ON. The drivability of the second emphasis driver 340 to pull up or down the output node ON may be smaller than that of the first emphasis driver 320 to pull up or down the output node ON. In an embodiment, the sum of the drivabilities of the first main driver 310 and the first emphasis driver 320 may be twice as large as the sum of the drivabilities of the second main driver 330 and the second emphasis driver 340.

The first main driver 310 may include a first transistor 311 and a second transistor 312. The first transistor 311 may be a P-channel MOS transistor, and the second transistor 312 may be an N-channel MOS transistor. The first transistor 311 may be coupled between the output node ON and a terminal to which a first supply voltage VD1 is supplied and may receive the first main driving signal MSBD through a gate thereof. When the first main driving signal MSBD has a low logic level, the first transistor 311 may pull up the output node ON by supplying the first supply voltage VD to the output node ON. The second transistor 312 may be coupled between the output node ON and a terminal to which a second supply voltage VD2 is supplied and may receive the first main driving signal MSBD through a gate thereof. When the first main driving signal MSBD has a high logic level, the second transistor 312 may pull down the output node ON by supplying the second supply voltage VD2 to the output node ON. The second supply voltage VD2 may have a lower voltage level than the first supply voltage VD1. The plurality of voltage levels that the output signal may have may be defined between the first and second supply voltages VD1 and VD2.

The first emphasis driver 320 may include a third transistor 321 and a fourth transistor 322. The third transistor 321 may be a P-channel MOS transistor, and the fourth transistor 322 may be an N-channel MOS transistor. The third transistor 321 may be coupled between the output node ON and the terminal to which the first supply voltage VD1 is supplied and may receive the first auxiliary driving signal MSBC through a gate thereof. When the first auxiliary driving signal MSBC has a low logic level, the third transistor 321 may pull up the output node ON by supplying the first supply voltage VD1 to the output node ON. The fourth transistor 322 may be coupled between the output node ON and the terminal to which the second supply voltage VD2 is supplied and may receive the first auxiliary driving signal MSBC through a gate thereof. When the first auxiliary driving signal MSBC has a high logic level, the fourth transistor 322 may pull down the output node ON by supplying the second supply voltage VD2 to the output node ON. The drivabilities and/or sizes of the first and second transistors 311 and 312 may be larger than those of the third and fourth transistors 321 and 322. The size may correspond to the ratio of channel width to channel length in the corresponding transistor (W/L ratio).

The second main driver 330 may include a fifth transistor 331 and a sixth transistor 332. The fifth transistor 331 may be a P-channel MOS transistor, and the sixth transistor 332 may be an N-channel MOS transistor. The fifth transistor 331 may be coupled between the output node ON and the terminal to which the first supply voltage VD1 is supplied and may receive the second main driving signal LSBD through a gate thereof. When the second main driving signal LSBD has a low logic level, the fifth transistor 331 may pull up the output node ON by supplying the first supply voltage VD1 to the output node ON. The sixth transistor 332 may be coupled between the output node ON and the terminal to which the second supply voltage VD2 is supplied and may receive the second main driving signal LSBD through a gate thereof. When the second main driving signal LSBD has a high logic level, the sixth transistor 332 may pull down the output node ON by supplying the second supply voltage VD2 to the output node ON.

The second emphasis driver 340 may include a seventh transistor 341 and an eighth transistor 342. The seventh transistor 341 may be a P-channel MOS transistor, and the eighth transistor 342 may be an N-channel MOS transistor. The seventh transistor 341 may be coupled between the output node ON and the terminal to which the first supply voltage VD1 is supplied and may receive the second auxiliary driving signal LSBC through a gate thereof. When the second auxiliary driving signal LSBC has a low logic level, the seventh transistor 341 may pull up the output node ON by supplying the first supply voltage VD1 to the output node ON. The eighth transistor 342 may be coupled between the output node ON and the terminal to which the second supply voltage VD2 is supplied and may receive the second auxiliary driving signal LSBC through a gate thereof. When the second auxiliary driving signal LSBC has a high logic level, the eighth transistor 342 may pull down the output node ON by supplying the second supply voltage VD2 to the output node ON. The drivabilities and sizes of the fifth and sixth transistors 331 and 332 may be larger than those of the seventh and eighth transistors 341 and 342. In an embodiment, the sum of the current drivabilities and/or sizes of the first and third transistors 311 and 321 may be twice as large as the sum of the current drivabilities and/or sizes of the fifth and seventh transistors 331 and 341. The sum of the current drivabilities and/or sizes of the second and fourth transistors 312 and 322 may be twice as large as the sum of the current drivabilities and/or sizes of the sixth and eighth transistors 332 and 342.

Figure 4:
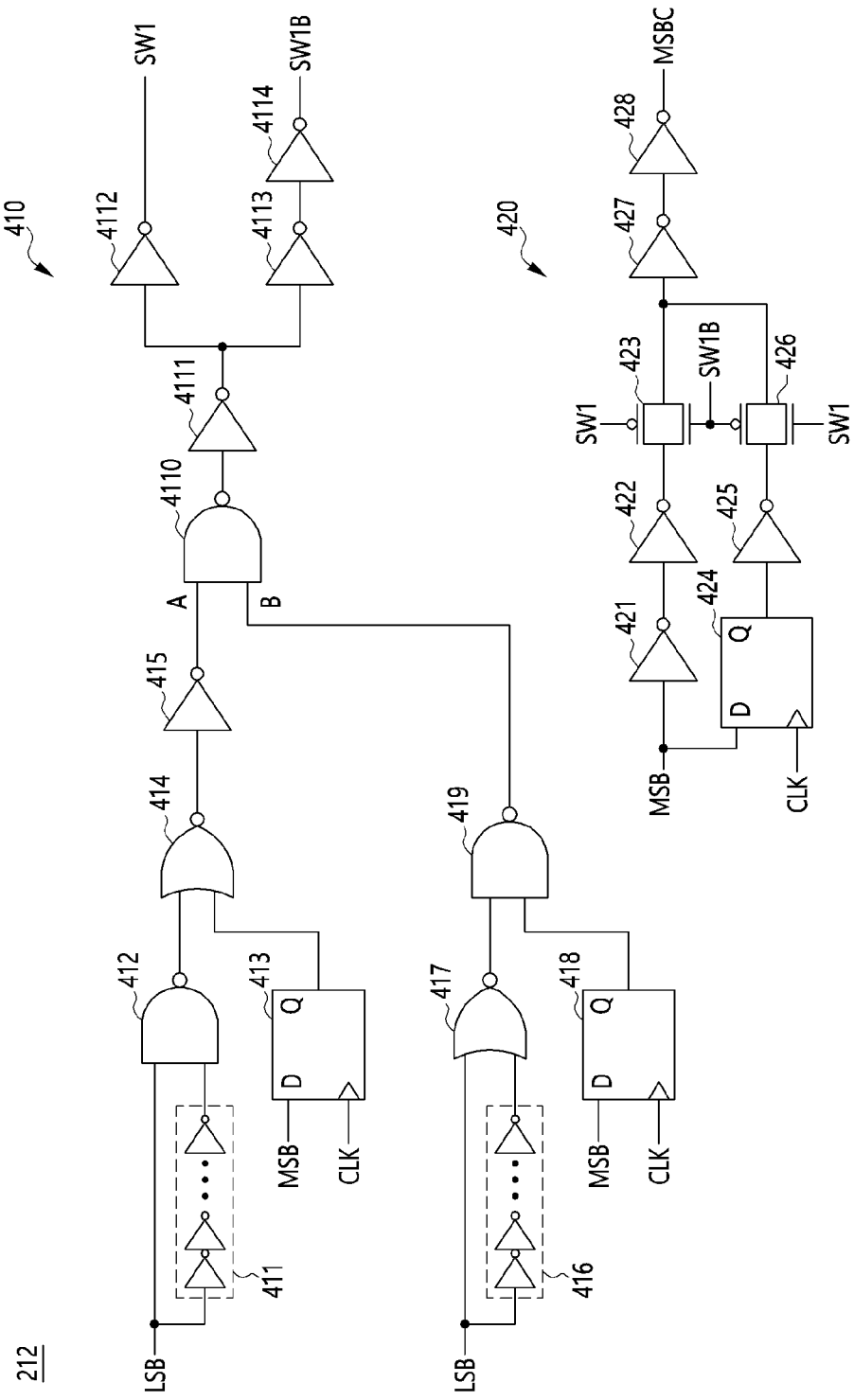
FIG. 4 is a diagram illustrating a configuration of a first emphasis control circuit illustrated in FIG. 2.

FIG. 4 is a diagram illustrating the configuration of the first emphasis control circuit 212 illustrated in FIG. 2. Referring to FIG. 4, the first emphasis control circuit 212 may include a first logic level sensing circuit 410 and a first auxiliary driving signal generating circuit 420. The first logic level sensing circuit 410 may receive the first and second control signals MSB and LSB and may generate a first switching control signal SW1 based on the first and second control signals MSB and LSB. The first logic level sensing circuit 410 may generate the first switching control signal SW1 by sensing whether the logic levels of the first and second control signals MSB and LSB transition. When the logic level of the first control signal MSB is retained at the first level and the logic level of the second control signal LSB transitions from the first logic level to the second logic level, the first logic level sensing circuit 410 may generate the first switching control signal SW1 that is enabled for a predetermined time.

The first auxiliary driving signal generating circuit 420 may receive the first control signal MSB and the first switching control signal SW1, and may generate the first auxiliary driving signal MSBC based on the first control signal MSB and the first switching control signal SW1. The first auxiliary driving signal generating circuit 420 may output the first control signal MSB as the first auxiliary driving signal MSBC and may drive the first auxiliary driving signal MSBC to the opposite logic level during a period in which the first switching control signal SW1 is enabled.

The first logic level sensing circuit 410 may include a first odd delay 411, a first NAND gate 412, a first flip-flop 413, a first NOR gate 414, a first inverter 415, a second odd delay 416, a second NOR gate 417, a second flip-flop 418, a second NAND gate 419, a third NAND gate 4110, a second inverter 4111, a third inverter 4112, a fourth inverter 4113, and a fifth inverter 4114. The first odd delay 411 may receive the second control signal LSB, delay the second control signal LSB, and output the delayed signal. The first odd delay 411 may include an odd number of inverters. The first odd delay 411 may have a delay time that corresponds to the predetermined time. The delay time of the first odd delay 411 may be set to various values in order to set the predetermined time. The first NAND gate 412 may receive and perform a NAND operation on the second control signal LSB and the output of the first odd delay 411. The first flip-flop 413 may receive the first control signal MSB, delay the first control signal MSB, and output the delayed signal. The first flip-flop 413 may further receive a clock signal CLK. The first flip-flop 413 may output the first control signal MSB in synchronization with the clock signal CLK. For example, the first flip-flop 413 may output the first control signal MSB in synchronization with a rising edge of the clock signal CLK. The first flip-flop may be a D-Q flip-flop. One period of the clock signal CLK may correspond to the unit duration of each of the first and second control signals MSB and LSB. That is, based on the current bit stream, the logic levels of the first and second control signals MSB and LSB may be retained during one period of the clock signal CLK. When the time that corresponds to one period of the clock signal CLK elapses, the logic levels of the first and second control signals MSB and LSB may be retained or changed to another logic level based on the next bit stream. The first NOR gate 414 may receive and perform a NOR operation on the output of the first NAND gate 412 and the output of the first flip-flop 413. The first inverter 415 may generate a first signal A by inverting an output of the first NOR gate 414.

The second odd delay 416 may receive the second control signal LSB, delay the second control signal LSB, and output the delayed signal. The second odd delay 416 may include an odd number of inverters. The second odd delay 416 may have a delay time that corresponds to the predetermined time. The delay time of the second odd delay 416 may be equal to the delay time of the first odd delay 411 and may include the same number of inverters as the number of inverters included in the first odd delay 411. The second NOR gate 417 may receive and perform a NOR operation on the second control signal LSB and the output of the second odd delay 416. The second flip-flop 418 may operate in the same manner as the first flip-flop 413. The second flip-flop 418 may receive the first control signal MSB and the clock signal CLK, and may output the first control signal MSB in synchronization with the clock signal CLK. The second flip-flop 418 may be a D-Q flip-flop. The second NAND gate 419 may receive and generate a second signal B by performing a NAND operation on the output of the second NOR gate 417 and the output of the second flip-flop 418.

The third NAND gate 4110 may receive and perform a NAND operation on the first and second signals A and B. The second inverter 4111 may invert an output of the third NAND gate 4110. The third inverter 4112 may generate the first switching control signal SW1 by inverting an output of the second inverter 4111. The fourth and fifth inverters 4113 and 4114 may generate a complementary signal SW1B of the first switching control signal SW1 by sequentially inverting the output of the second inverter 4111.

The first auxiliary driving signal generating circuit 420 may include a first inverter 421, a second inverter 422, a first pass gate 423, a flip-flop 424, a third inverter 425, a second pass gate 426, a fourth inverter 427, and a fifth inverter 428. The first inverter 421 may receive and invert the first control signal MSB. The second inverter 422 may receive and invert an output of the first inverter 421. The first pass gate 423 may receive the first switching control signal SW1, the complementary signal SW1B of the first switching control signal, and an output of the second inverter 422 and may selectively output the output of the second inverter 422 based on the first switching control signal SW1. The first pass gate 423 may output the output of the second inverter 422 when the first switching control signal SW1 is disabled to a low logic level and may block the output of the second inverter 422 when the first switching control signal SW1 is enabled to a high logic level. The flip-flop 424 may receive the first control signal MSB and the clock signal CLK, and may output the first control signal MSB in synchronization with the clock signal CLK. The flip-flop 424 may be a D-Q flip-flop. The third inverter 425 may invert an output of the flip-flop 424. The second pass gate 426 may receive the first switching control signal SW1, the complementary signal SW1B of the first switching control signal, and an output of the third inverter 425 and may selectively output the output of the third inverter 425 based on the first switching control signal SW1. The second pass gate 426 may output the output of the third inverter 425 when the first switching control signal SW1 is enabled to a high logic level and may block the output of the third inverter 425 when the first switching control signal SW1 is disabled to a low logic level. The fourth inverter 427 may be coupled to the first and second pass gates 423 and 426 in common. The fourth and fifth inverters 427 and 428 may generate the first auxiliary driving signal MSBC by sequentially inverting the outputs of the first and second pass gates 423 and 426.

Figure 5:
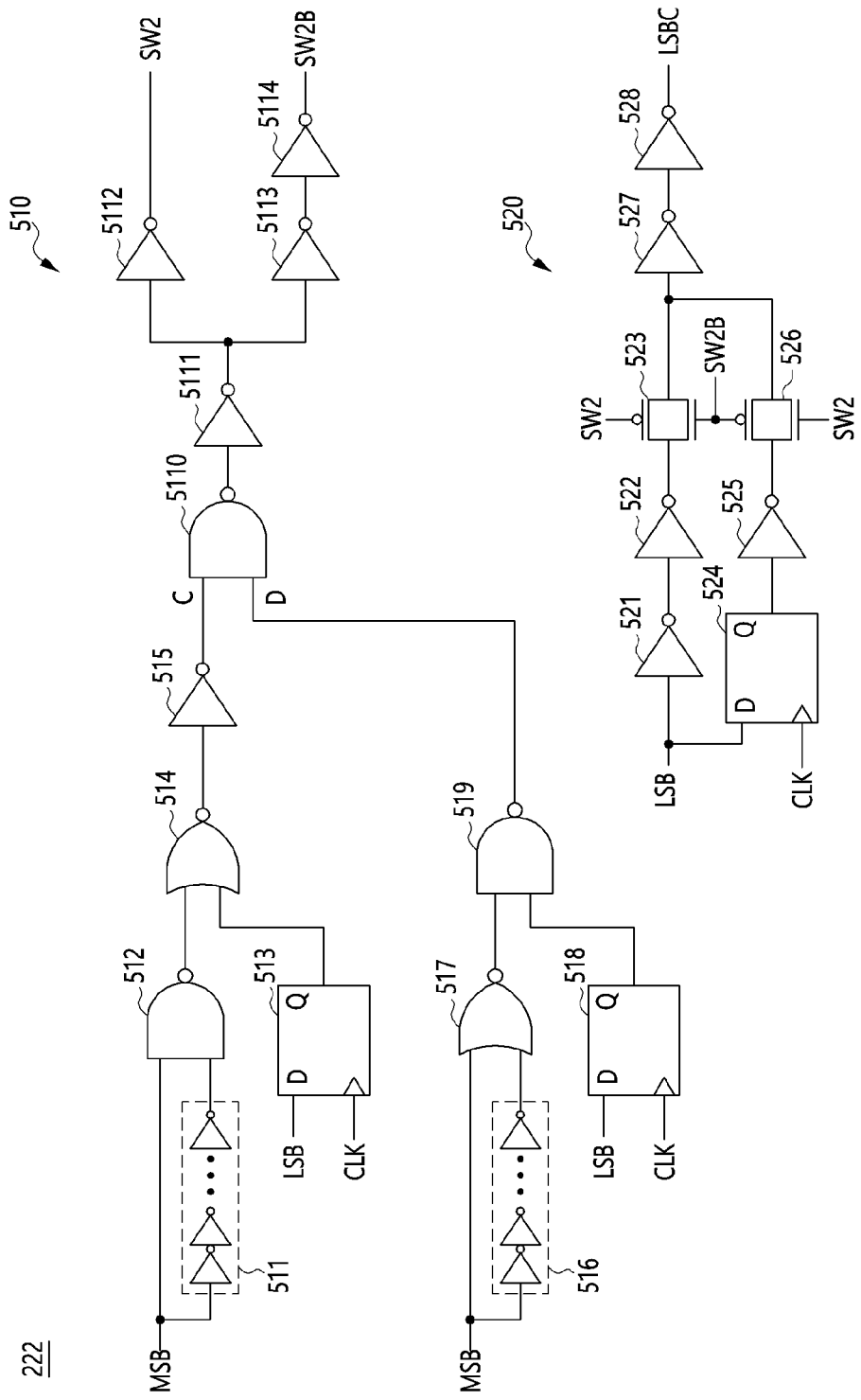
FIG. 5 is a diagram illustrating a configuration of a second emphasis control circuit illustrated in FIG. 2.

FIG. 5 is a diagram illustrating the configuration of the second emphasis control circuit 222 illustrated in FIG. 2. Referring to FIG. 5, the second emphasis control circuit 222 may include a second logic level sensing circuit 510 and a second auxiliary driving signal generating circuit 520. The second logic level sensing circuit 510 may receive the first and second control signals MSB and LSB, and may generate a second switching control signal SW2 based on the first and second control signals MSB and LSB. The second logic level sensing circuit 510 may generate the second switching control signal SW2 by sensing whether the logic levels of the first and second control signals MSB and LSB are changed. When the logic level of the second control signal LSB is retained at the first level and the logic level of the first control signal MSB transitions from the first logic level to the second logic level, the second logic level sensing circuit 510 may generate the second switching control signal SW2, which is enabled for a predetermined time.

The second auxiliary driving signal generating circuit 520 may receive the second control signal LSB and the second switching control signal SW2, and may generate the second auxiliary driving signal LSBC based on the second control signal LSB and the second switching control signal SW2. The second auxiliary driving signal generating circuit 520 may output the second control signal LSB as the second auxiliary driving signal LSBC and may drive the second auxiliary driving signal LSBC to the opposite logic level during a period in which the second switching control signal SW2 is enabled.

The second logic level sensing circuit 510 may include a first odd delay 511, a first NAND gate 512, a first flip-flop 513, a first NOR gate 514, a first inverter 515, a second odd delay 516, a second NOR gate 517, a second flip-flop 518, a second NAND gate 519, a third NAND gate 5110, a second inverter 5111, a third inverter 5112, a fourth inverter 5113, and a fifth inverter 5114. The first odd delay 511 may receive the first control signal MSB, delay the first control signal MSB, and output the delayed signal. The first odd delay 511 may include an odd number of inverters. The first odd delay 511 may have a delay time that corresponds to the predetermined time. The first odd delay 511 of the second logic level sensing circuit 510 may include the same number of inverters as the number of inverters that are included in each of the first and second odd delays 411 and 416 of the first logic level sensing circuit 410 illustrated in FIG. 4. The first NAND gate 512 may receive and perform a NAND operation on the first control signal MSB and the output of the first odd delay 511. The first flip-flop 513 may receive the second control signal LSB and the clock signal CLK, delay the second control signal LSB, and output the delayed signal. The first flip-flop 513 may output the second control signal LSB in synchronization with the clock signal CLK. For example, the first flip-flop 513 may output the second control signal LSB in synchronization with a rising edge of the clock signal CLK. The first flip-flop 513 may be a D-Q flip-flop. The first NOR gate 514 may receive and perform a NOR operation on the output of the first NAND gate 512 and the output of the first flip-flop 513. The first inverter 515 may generate a third signal C by inverting an output of the first NOR gate 514.

The second odd delay 516 may receive the first control signal MSB, delay the first control signal MSB, and output the delayed signal. The second odd delay 516 may include an odd number of inverters. The second odd delay 516 may have a delay time that corresponds to the predetermined time. The delay time of the second odd delay 516 may be equal to the delay time of the first odd delay 511 and may the second odd delay 516 may include the same number of inverters as the number of inverters included in the first odd delay 511. The second NOR gate 517 may receive and perform a NOR operation on the first control signal MSB and the output of the second odd delay 516. The second flip-flop 518 may operate in the same manner as the first flip-flop 513. The second flip-flop 518 may receive the second control signal LSB and the clock signal CLK, and may output the second control signal LSB in synchronization with the clock signal CLK. The second flip-flop may be a D-Q flip-flop. The second NAND gate 519 may generate a fourth signal D by performing a NAND operation on the output of the second NOR gate 517 and the output of the second flip-flop 518.

The third NAND gate 5110 may receive and perform a NAND operation on the third and fourth signals C and D. The second inverter 5111 may invert an output of the third NAND gate 5110. The third inverter 5112 may generate the second switching control signal SW2 by inverting an output of the second inverter 5111. The fourth and fifth inverters 5113 and 5114 may generate a complementary signal SW2B of the second switching control signal SW2 by sequentially inverting the output of the second inverter 5111.

The second auxiliary driving signal generating circuit 520 may include a first inverter 521, a second inverter 522, a first pass gate 523, a flip-flop 524, a third inverter 525, a second pass gate 526, a fourth inverter 527, and a fifth inverter 528. The first inverter 521 may receive and invert the second control signal LSB. The second inverter 522 may receive and invert an output of the first inverter 521. The first pass gate 523 may receive the second switching control signal SW2, the complementary signal SW2B of the second switching control signal, and an output of the second inverter 522 and may selectively output the output of the second inverter 522 based on the second switching control signal SW2. The first pass gate 523 may output the output of the second inverter 522 when the second switching control signal SW2 is disabled to a low logic level and may block the output of the second inverter 522 when the second switching control signal SW2 is enabled to a high logic level. The flip-flop 524 may receive the second control signal LSB and the clock signal CLK, and may output the second control signal LSB in synchronization with the clock signal CLK. The flip-flop may be a D-Q flip-flop. The third inverter 525 may invert an output of the flip-flop 524. The second pass gate 526 may receive the second switching control signal SW2, the complementary signal SW2B of the second switching control signal, and an output of the third inverter 525 and may selectively output the output of the third inverter 525 based on the second switching control signal SW2. The second pass gate 526 may output the output of the third inverter 525 when the second switching control signal SW2 is enabled to a high logic level and may block the output of the third inverter 525 when the second switching control signal SW2 is disabled to a low logic level. The fourth inverter 527 may be coupled to the first and second pass gates 523 and 526 in common. The fourth and fifth inverters 527 and 528 may generate the second auxiliary driving signal LSBC by sequentially inverting the outputs of the first and second pass gates 523 and 526.

Figure 6A:
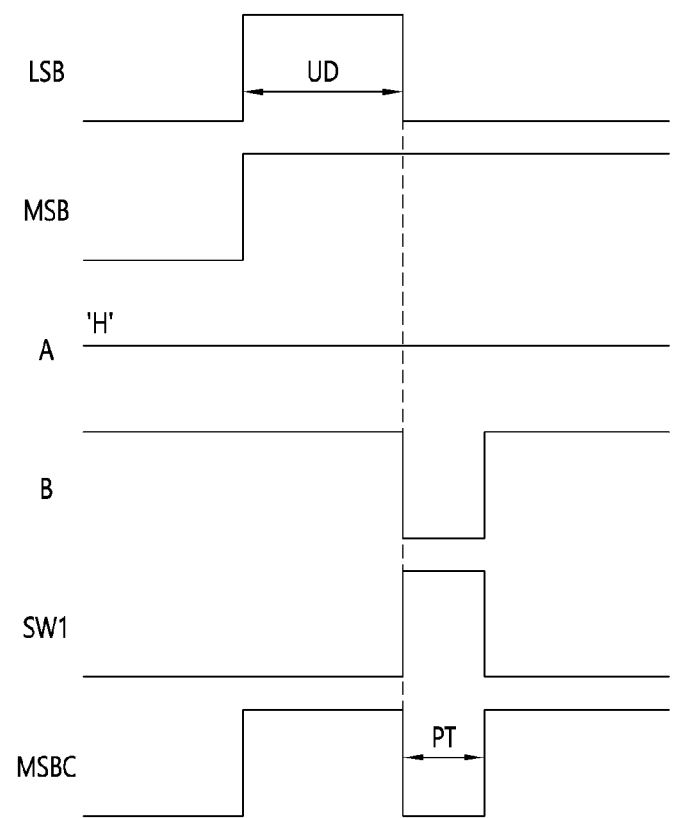
FIG. 6A is a diagram illustrating an operation of the first emphasis control circuit illustrated in FIG. 4.

FIG. 6A is a timing diagram illustrating the operation of the first emphasis control circuit 212 illustrated in FIG. 4. Referring to FIGS. 4 and 6A, the operation of the first emphasis control circuit 212 will be described as follows. For clear description, it is assumed that the first control signal MSB retains a high logic level, and the second control signal LSB transitions from a high logic level to a low logic level. When the time that corresponds to the unit duration UD has elapsed after the logic level of the second control signal LSB has transitioned from a low logic level to a high logic level, the second control signal LSB may transition from a high logic level to a low logic level. When the second control signal LSB transitions from a high logic level to a low logic level, the logic level of the first signal A may be retained at a high logic level, and the second signal B may have a pulse, the logic level of which transitions to a low logic level for a predetermined time from the point of time in which the logic level of the second control signal LSB transitions to a low logic level. Therefore, the first switching control signal SW1 may be enabled to a high logic level for a predetermined time from the point of time in which the logic level of the second control signal LSB transitions. When the first switching control signal SW1 is disabled to a low logic level, the first auxiliary driving signal generating circuit 420 may output the first control signal MSB as the first auxiliary driving signal MSBC, and the first auxiliary driving signal MSBC may have a high logic level. When the first switching control signal SW1 is disabled to a high logic level, the first auxiliary driving signal generating circuit 420 may output an inverted signal of the first control signal MSB as the first auxiliary driving signal MSBC, and the first auxiliary driving signal MSBC may be changed to a low logic level. When the first switching control signal SW1 is disabled again after a predetermined time PT, the first control signal MSB may be outputted as the first auxiliary driving signal MSBC. Thus, the first auxiliary driving signal MSBC may be changed back to a high logic level and may be retained at a high logic level based on the first control signal MSB. Therefore, the first auxiliary driving signal MSBC may be changed to a low logic level for a predetermined time PT from the point of time in which the second control signal LSB transitions to a low logic level. After a predetermined time PT, the first auxiliary driving signal MSBC may be changed back to a high logic level.

Figure 6B:
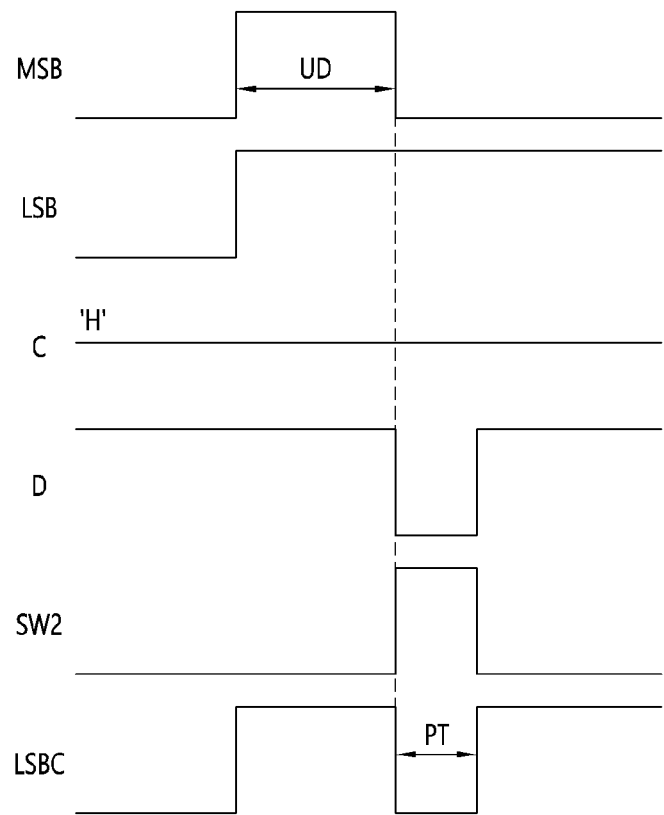
FIG. 6B is a diagram illustrating an operation of the second emphasis control circuit illustrated in FIG. 5.

FIG. 6B is a timing diagram illustrating the operation of the second emphasis control circuit 222 illustrated in FIG. 5. Referring to FIGS. 5 and 6B, the operation of the second emphasis control circuit 222 will be described as follows. For dear description, it is assumed that the first control signal MSB transitions from a high logic level to a low logic level, and the second control signal LSB retains a high logic level. When the time that corresponds to the unit duration UD has elapsed after the logic level of the first control signal MSB has transitioned from a low logic level to a high logic level, the first control signal MSB may transition from a high logic level to a low logic level. When the first control signal MSB transitions from a high logic level to a low logic level, the third signal C may be retained at a high logic level, and the fourth signal D may have a pulse which transitions to a low logic level for a predetermined time from the point of time in which the first control signal MSB transitions to a low logic level. Therefore, the second switching control signal SW2 may be enabled to a high logic level for a predetermined time from the point of time in which the logic level of the first control signal MSB transitions. When the second switching control signal SW2 is disabled to a low logic level, the second auxiliary driving signal generating circuit 520 may output the second control signal MSB as the second auxiliary driving signal LSBC, and the second auxiliary driving signal LSBC may have a high logic level. When the second switching control signal SW2 is enabled to a high logic level, the second auxiliary driving signal generating circuit 520 may output an inverted signal of the second control signal LSB as the second auxiliary driving signal LSBC, and the second auxiliary driving signal LSBC may be changed to a low logic level. When the second switching control signal SW2 is disabled again after the predetermined time, the second control signal LSB may be outputted as the second auxiliary driving signal LSBC. Thus, the second auxiliary driving signal LSBC may be changed back to a high logic level and may be retained at a high logic level based on the second control signal LSB. Therefore, the second auxiliary driving signal LSBC may be changed to a low logic level for a predetermined time PT from the point of time in which the first control signal MSB transitions to a low logic level. After a predetermined time PT, the second auxiliary driving signal LSBC may be changed back to a high logic level.

The following table may show the operation of the signal transmitting circuit 200 in accordance with the present embodiment.

| State | MSB | LSB | MSBC | LSBC |
|---|---|---|---|---|
| 0 → 1 | H → H | H → L | H → L → H | H → L |
| 0 → 2 | H → L | H → H | H → L | H → L → H |
| 0 → 3 | H → L | H → L | H → L | H → L |
| 1 → 0 | H → H | L → H | H → H | L → H |
| 1 → 2 | H → L | L → H | H → L | L → H |
| 1 → 3 | H → L | L → L | H → L | L → L |
| 2 → 0 | L → H | H → H | L → H | H → H |
| 2 → 1 | L → H | H → L | L → H | H → L |
| 2 → 3 | L → L | H → L | L → L | H → L |
| 3 → 0 | L → H | L → H | L → H | L → H |
| 3 → 1 | L → H | L → L | L → H | L → H → L |
| 3 → 2 | L → L | L → H | L → H → L | L → H |

In the above table, 'State' may indicate the state of a bit stream, State '0' may indicate the first state, State '1' may indicate the second state, State '2' may indicate the third state, and State '3' may indicate the fourth state. Furthermore, 'H' may indicate a high logic level, and 'L' may indicate a low logic level. Furthermore, an arrow may indicate the direction in which the logic level changes.

Referring to FIGS. 1 to 5 with the table, when the state of the bit stream transitions from the first state to the second state, the first control signal MSB may be retained at a high logic level, and the second control signal LSB may transition from a high logic level to a low logic level. The first pre-driver 211 may provide the first control signal MSB as the first main driving signal MSBD, and the first main driver 310 may continuously pull down the output node ON based on the first main driving signal MSBD. The second pre-driver 221 may provide the second control signal LSB as the second main driving signal LSBD. The second main driver 330 may pull up the output node ON when the second main driving signal LSBD transitions to a low logic level. Since the first main driver 310 has a larger drivability than the second main driver 330, the output node ON and the output signal OUT may be driven to a voltage level that corresponds to the second voltage level V2. At this time, the first emphasis control circuit 212 may drive the first auxiliary driving signal MSBC to a low logic level for a predetermined time from the point of time in which the logic level of the second control signal LSB transitions and then change the first auxiliary driving signal MSBC back to a high logic level. The second emphasis control circuit 222 may change the second auxiliary driving signal LSBC from a high logic level to a low logic level based on the second control signal LSB. The first emphasis driver 320 may pull up the output node ON for the predetermined time, based on the first auxiliary driving signal MSBC, thereby helping the second main driver 330 and the second emphasis driver 340 to pull up the output node ON. Therefore, since the output signal OUT can quickly rise from the first voltage level V1 to the second voltage level V2, the signal transmitting circuit 200 may expand the valid window of the Tx signal TS that is transmitted through the signal transmitting bus 101 or 201.

When the state of the bit stream transitions from the first state to the third state, the first control signal MSB may transition from a high logic level to a low logic level, and the second control signal LSB may be retained at a high logic level. The first pre-driver 211 may provide the first control signal MSB as the first main driving signal MSBD. The first main driver 310 may pull up the output node ON when the first main driving signal MSBD transitions. The second pre-driver 221 may provide the second control signal LSB as the second main driving signal LSBD, and the second main driver 330 may continuously pull down the output node ON based on the second main driving signal LSBD. Since the first main driver 310 has a larger drivability than the second main driver 330, the output node ON and the output signal OUT may be driven to a voltage level that corresponds to the third voltage level V3. At this time, the second emphasis control circuit 222 may drive the second auxiliary driving signal LSBC to a low logic level for a predetermined time from the point of time in which the logic level of the first control signal MSB transitions and then change the second auxiliary driving signal LSBC back to a high logic level. The first emphasis control circuit 212 may change the first auxiliary driving signal MSBC from a high logic level to a low logic level based on the first control signal MSB. The second emphasis driver 340 may pull up the output node ON for the predetermined time, based on the second auxiliary driving signal LSBC, thereby helping the first main driver 310 and the first emphasis driver 320 to pull up the output node ON. Therefore, since the output signal OUT can quickly rise from the first voltage level V1 to the third voltage level V3, the signal transmitting circuit 200 may expand the valid window of the Tx signal TS that is transmitted through the signal transmitting bus 101 or 201.

When the state of the bit stream transitions from the first state to the fourth state, when the state of the bit stream transitions from the second state to one of the first, third, and fourth states, when the state of the bit stream transitions from the third state to one of the first to third states, and when the state of the bit stream transitions from the fourth state to the first state, the signal transmitting circuit 200 might not drive the first and second auxiliary driving signals MSBC and LSBC to the opposite logic levels for a predetermined time.

When the state of the bit stream transitions from the fourth state to the second state, the logic level of the first control signal MSB may transition from a low logic level to a high logic level, and the second control signal LSB may be retained at a low logic level. The first pre-driver 211 may provide the first control signal MSB as the first main driving signal MSBD. The first main driver 310 may pull down the output node ON when the first main driving signal MSBD transitions. The second pre-driver 221 may provide the second control signal LSB as the second main driving signal LSBD, and the second main driver 330 may continuously pull up the output node ON based on the second main driving signal LSBD. Since the first main driver 310 has a larger drivability than the second main driver 330, the output node ON and the output signal OUT may be driven to a voltage level that corresponds to the second voltage level V2. At this time, the second emphasis control circuit 222 may drive the second auxiliary driving signal LSBC to a high logic level for a predetermined time from the point of time in which the logic level of the first control signal MSB transitions and then change the second auxiliary driving signal LSBC back to a low logic level. The first emphasis control circuit 212 may change the first auxiliary driving signal MSBC from a low logic level to a high logic level based on the first control signal MSB. The second emphasis driver 340 may pull down the output node ON for the predetermined time, based on the second auxiliary driving signal LSBC, thereby helping the first main driver 310 and the first emphasis driver 320 to pull down the output node ON. Therefore, since the output signal OUT can quickly fall from the fourth voltage level V4 to the second voltage level V2, the signal transmitting circuit 200 may expand the valid window of the Tx signal TS that is transmitted through the signal transmitting bus 101 or 201.

When the state of the bit stream transitions from the fourth state to the third state, the first control signal MSB may be retained at a low logic level, and the second control signal LSB may transition from a low logic level to a high logic level. The first pre-driver 211 may provide the first control signal MSB as the first main driving signal MSBD, and the first main driver 310 may continuously pull up the output node ON based on the first main driving signal MSBD. The second pre-driver 221 may provide the second control signal LSB as the second main driving signal LSBD. The second main driver 330 may pull down the output node ON when the second main driving signal LSBD transitions to a high logic level. Since the first main driver 310 has a larger drivability than the second main driver 330, the output node ON and the output signal OUT may be driven to a voltage level that corresponds to the third voltage level V3. At this time, the first emphasis control circuit 212 may drive the first auxiliary driving signal MSBC to a high logic level for a predetermined time from the point of time in which the logic level of the second control signal LSB transitions and then change the first auxiliary driving signal MSBC back to a low logic level. The second emphasis control circuit 222 may change the second auxiliary driving signal LSBC from a high logic level to a low logic level based on the second control signal LSB. The first emphasis driver 320 may pull down the output node ON for the predetermined time, based on the first auxiliary driving signal MSBC, thereby helping the second main driver 330 and the second emphasis driver 340 to pull down the output node ON. Therefore, since the output signal OUT can quickly rise from the fourth voltage level V4 to the third voltage level V3, the signal transmitting circuit 200 may expand the valid window of the Tx signal TS that is transmitted through the signal transmitting bus 101 or 201.

FIG. 7 is a timing diagram illustrating the operation of the signal transmitting circuit 200 in accordance with the present embodiment. In FIG. 7, the time intervals between T1 and T2, between T2 and T3, . . . , and between T12 to 13 may each correspond to the unit duration UD. At T1, a bit stream may have the first state, and the first and second control signals MSB and LSB may both have a high logic level. At T2, when the state of the bit stream transitions to the second state, the first control signal MSB may retain a high logic level, and the second control signal LSB may be changed to a low logic level. Therefore, the first main driving signal MSBD may retain a high logic level based on the first control signal MSB, and the second main driving signal LSBD and the second auxiliary driving signal LSBC may be changed to a low logic level based on the second control signal LSB. The first auxiliary driving signal MSBC may be changed to a low logic level for a predetermined time PT from the point of time in which the second control signal LSB transitions to a low logic level and then changed back to a high logic level. Therefore, the first auxiliary driving signal MSBC may toggle to a low logic level for a predetermined time PT. While the first auxiliary driving signal MSBC toggles, the voltage level of the output signal OUT as well as the voltage levels of the second main driving signal LSBD and the second auxiliary driving signal LSBC may be changed.

At T3, when the state of the bit stream transitions from the second state to the third state, the first control signal MSB may be changed from a high logic level to a low logic level, and the second control signal LSB may be changed from a low logic level to a high logic level. The first main driving signal MSBD and the first auxiliary driving signal MSBC may have a low logic level based on the first control signal MSB, and the second main driving signal LSBD and the second auxiliary driving signal LSBC may have a high logic level based on the second control signal LSB.

At T4, when the state of the bit stream transitions from the third state to the fourth state, the first control signal MSB may be retained at a low logic level, and the second control signal LSB may be changed from a high logic level to a low logic level. The first main driving signal MSBD and the first auxiliary driving signal MSBC may be retained at a low logic level based on the first control signal MSB, and the second main driving signal LSBD and the second auxiliary driving signal LSBC may have a low logic level based on the second control signal LSB. At T5, the state of the bit stream may be retained at the fourth state, and the first main driving signal MSBD, the first auxiliary driving signal MSBC, the second main driving signal LSBD and the second auxiliary driving signal LSBC may be all retained at a low logic level.

At T6, when the state of the bit stream transitions from the fourth state to the second state, the first control signal MSB may be changed from a low logic level to a high logic level, and the second control signal LSB may be retained at a low logic level. The first main driving signal MSBD and the first auxiliary driving signal MSBC may be changed to at a high logic level based on the first control signal MSB, and the second main driving signal LSBD may be retained at a low logic level based on the second control signal LSBC. The second auxiliary driving signal LSBC may be changed to a high logic level for a predetermined time PT from the point of time in which the first control signal MSB transitions to a high logic level and then changed back to a low logic level. Therefore, the second auxiliary driving signal LSBC may toggle to a high logic level for a predetermined time PT. While the second auxiliary driving signal LSBC toggles, the voltage level of the output signal OUT as well as the voltage levels of the first main driving signal MSBD and the first auxiliary driving signal MSBC may be changed.

At T7, when the state of the bit stream transitions from the second state to the third state, the first control signal MSB may be changed from a high logic level to a low logic level, and the second control signal LSB may be changed from a low logic level to a high logic level. The first main driving signal MSBD and the first auxiliary driving signal MSBC may have a low logic level based on the first control signal MSB, and the second main driving signal LSBD and the second auxiliary driving signal LSBC may have a high logic level based on the second control signal LSB.

At T8, when the state of the bit stream transitions from the third state to the fourth state, the first control signal MSB may be retained at a low logic level, and the second control signal LSB may be changed from a high logic level to a low logic level. The first main driving signal MSBD and the first auxiliary driving signal MSBC may be retained at a low logic level based on the first control signal MSB, and the second main driving signal LSBD and the second auxiliary driving signal LSBC may have a low logic level based on the second control signal LSB. At T9, the state of the bit stream may be retained at the fourth state, and the first main driving signal MSBD, the first auxiliary driving signal MSBC, the second main driving signal LSBD and the second auxiliary driving signal LSBC may be all retained at a low logic level.

At T10, when the state of the bit stream transitions from the fourth state to the first state, the first and second control signals MSB and LSB may be both changed from a low logic level to a high logic level. The first main driving signal MSBD and the first auxiliary driving signal MSBC may both have a high logic level based on the first control signal MSB, and the second main driving signal LSBD and the second auxiliary driving signal LSBC may both have a high logic level based on the second control signal LSB.

At T11, when the state of the bit stream transitions from the first state to the third state, the first control signal MSB may be changed from a high logic level to a low logic level, and the second control signal LSB may be retained at a high logic level. The first main driving signal MSBD and the first auxiliary driving signal MSBC may be changed to at a low logic level based on the first control signal MSB, and the second main driving signal LSBD may be retained at a high logic level based on the second control signal LSB. The second auxiliary driving signal LSBC may be changed to a low logic level for a predetermined time PT from the point of time in which the first control signal MSB is changed to a low logic level and then changed back to a high logic level. Therefore, the second auxiliary driving signal LSBC may toggle to a low logic level for a predetermined time PT. While the second auxiliary driving signal LSBC toggles, the voltage level of the output signal OUT as well as the voltage levels of the first main driving signal MSBD and the first auxiliary driving signal MSBC may be changed.

At T12, when the state of the bit stream transitions from the third state to the second state, the first control signal MSB may be changed from a low logic level to a high logic level, and the second control signal LSB may be changed from a high logic level to a low logic level. The first main driving signal MSBD and the first auxiliary driving signal MSBC may have a high logic level based on the first control signal MSB, and the second main driving signal LSBD and the second auxiliary driving signal LSBC may have a low logic level based on the second control signal LSB. At T13, the state of the bit stream may be retained at the second state, the first main driving signal MSBD and the first auxiliary driving signal MSBC may be both retained at a high level, and the second main driving signal LSBD and the second auxiliary driving signal LSBC may be both retained at a low logic level.

While various embodiments have been described above, it will be understood to those skilled in the art that the embodiments described are examples only. Accordingly, the signal transmitting circuit, the semiconductor apparatus and the semiconductor system, which have been described herein, should not be limited based on the described embodiments.

What is claimed is:

1. A signal transmitting circuit comprising:
a first output control circuit configured to generate a first main driving signal based on a first control signal and generate a first auxiliary driving signal based on the first control signal and a second control signal;
a second output control circuit configured to generate a second main driving signal based on the second control signal and generate a second auxiliary driving signal based on the first control signal and the second control signal;
a first output driver configured to drive an output node based on the first main driving signal and the first auxiliary driving signal; and
a second output driver configured to drive the output node based on the second main driving signal and the second auxiliary driving signal.

2. The signal transmitting circuit according to claim 1, wherein the first output control circuit comprises:
a first pre-driver configured to generate the first main driving signal based on the first control signal; and
a first emphasis control circuit configured to generate the first auxiliary driving signal based on the first and second control signals by sensing whether the logic levels of the first and second control signals transition.

3. The signal transmitting circuit according to claim 2, wherein the first emphasis control circuit is configured to change the first auxiliary driving signal from a first logic level to a second logic level, when the logic level of the first control signal is retained at the first logic level and the logic level of the second control signal is changed from the first logic level to the second logic level.

4. The signal transmitting circuit according to claim 3, wherein the first emphasis control circuit is configured to change the first auxiliary driving signal, a logic level of which has been changed to the second logic level, back to the first logic level after a predetermined time.

5. The signal transmitting circuit according to claim 2, wherein the first emphasis control circuit comprises:
a first logic level sensing circuit configured to generate a first switching control signal that is enabled for a predetermined time when the logic level of the first control signal is retained at a first logic level and the logic level of the second control signal is changed from the first logic level to a second logic level; and
a first auxiliary driving signal generating circuit configured to generate the first auxiliary driving signal based on the first control signal and the first switching control signal.

6. The signal transmitting circuit according to claim 5, wherein the first auxiliary driving signal generating circuit is configured to output the first control signal as the first auxiliary driving signal and configured to drive the first auxiliary driving signal to the opposite logic level during a period in which the first switching control signal is enabled.

7. The signal transmitting circuit according to claim 2, wherein the second output control circuit comprises:

a second pre-driver configured to generate the second main driving signal based on the second control signal; and a second emphasis control circuit configured to generate the second auxiliary driving signal based on the first and second control signals by sensing whether the logic levels of the first and second control signals transition.

8. The signal transmitting circuit according to claim 7, wherein the second emphasis control circuit is configured to change the second auxiliary driving signal from the first logic level to the second logic level when the logic level of the second control signal is retained at the first logic level and the logic level of the second control signal transitions from the first logic level to the second logic level.

9. The signal transmitting circuit according to claim 8, wherein the second emphasis control circuit changes the second auxiliary driving signal, a logic level of which has been changed to the second logic level, back to the first logic level after a predetermined time.

10. The signal transmitting circuit according to claim 7, wherein the second emphasis control circuit comprises:
a second logic level sensing circuit configured to generate a second switching control signal that is enabled for a predetermined time when the logic level of the second control signal is retained at the first logic level and the logic level of the first control signal is changed from the first logic level to the second logic level; and
a second auxiliary driving signal generating circuit configured to generate the second auxiliary driving signal based on the second control signal and the second switching control signal.

11. The signal transmitting circuit according to claim 10, wherein the second auxiliary driving signal generating circuit is configured to output the second control signal as the second auxiliary driving signal and configured to drive the second auxiliary driving signal to the opposite logic level during a period in which the second switching control signal is enabled.

12. The signal transmitting circuit according to claim 1, wherein the first output driver comprises:
a first main driver configured to pull up or down the output node based on the first main driving signal; and
a first emphasis driver configured to pull up or down the output node based on the first auxiliary driving signal.

13. The signal transmitting circuit according to claim 12, wherein the second output driver comprises:
a second main driver configured to pull up or down the output node based on the second main driving signal; and
a second emphasis driver configured to pull up or down the output node based on the second auxiliary driving signal.

14. The signal transmitting circuit according to claim 13, wherein the drivability of the first main driver to pull up or down the output node is larger than the drivability of the first emphasis driver to pull up or down the output node, and
wherein the drivability of the second main driver to pull up or down the output node is larger than the drivability of the second emphasis driver to pull up or down the output node.

15. The signal transmitting circuit according to claim 13, wherein the drivability of the first main driver to pull up or down the output node is larger than the drivability of the second main driver to pull up or down the output node, and wherein the drivability of the first emphasis driver to pull up or down the output node is larger than the drivability of the second emphasis driver to pull up or down the output node.

16. A signal transmitting circuit comprising:
a first output control circuit configured to generate a first main driving signal and a first auxiliary driving signal from a first control signal and configured to change a logic level of the first auxiliary driving signal to a second logic level for a predetermined time when the logic level of the first control signal is retained at a first logic level and a logic level of a second control signal transitions from the first logic level to the second logic level;
a second output control circuit configured to generate a second main driving signal and a second auxiliary driving signal from the second control signal and configured to change the logic level of the second auxiliary driving signal to the second logic level for the predetermined time when the logic level of the second control signal is retained at the first logic level and the logic level of the first control signal transitions from the first logic level to the second logic level;
a first output driver configured to drive an output node based on the first main driving signal and the first auxiliary driving signal; and
a second output driver configured to drive the output node based on the second main driving signal and the second auxiliary driving signal.

17. The signal transmitting circuit according to claim 16, wherein the predetermined time is shorter than the unit duration of each of the first and second control signals.

18. The signal transmitting circuit according to claim 16, wherein the first output driver comprises:
a first main driver configured to pull up or down the output node based on the first main driving signal; and
a first emphasis driver configured to pull up or down the output node based on the first auxiliary driving signal,
wherein the drivability of the first main driver is larger than the drivability of the first emphasis driver.

19. The signal transmitting circuit according to claim 18, wherein the second output driver comprises:
a second main driver configured to pull up or down the output node based on the second main driving signal; and
a second emphasis driver configured to pull up or down the output node based on the second auxiliary driving signal,
wherein the drivability of the second main driver is larger than the drivability of the second emphasis driver.

20. The signal transmitting circuit according to claim 19, wherein the drivability of the first main driver is larger than the drivability of the second main driver, and
wherein the drivability of the first emphasis driver is larger than the drivability of the second emphasis driver.

21. The signal transmitting circuit according to claim 19, wherein the sum of the drivabilities of the first main driver and the first emphasis driver is twice as large as the sum of the drivabilities of the second main driver and the second emphasis driver.

22. A semiconductor apparatus comprising a signal transmitting circuit configured to generate an output signal based on a first control signal and a second control signal, which define at least a first state, a second state, a third state, and a fourth state of a bit stream, and configured to perform an emphasis operation on the output signal based on a control signal whose logic level is retained to be one of the first and second control signals, when the bit stream transitions from one of the first and fourth states to one of the second and third states.

23. The semiconductor apparatus according to claim 22, wherein the signal transmitting circuit is configured to perform the emphasis operation by driving the first control signal to the opposite logic level for a predetermined time when the logic level of the first control signal is retained at a first logic level and the logic level of the second control signal transitions from the first logic level to a second logic level, and configured to perform the emphasis operation by driving the second control signal to the opposite logic level for the predetermine time when the logic level of the second control signal is retained at the first logic level and the logic level of the first control signal transitions from the first logic level to the second logic level.

24. The semiconductor apparatus according to claim 23, wherein the predetermined time is shorter than the unit duration of each of the first and second control signals.

* * * * *